United States Patent [19]
Gugel

[11] Patent Number: 5,442,857
[45] Date of Patent: Aug. 22, 1995

[54] PORTABLE POWERED HACK-SAW

[76] Inventor: Leslie H. Gugel, 161 E. Hampton Way, Jupiter, Fla. 33458

[21] Appl. No.: 222,196

[22] Filed: Apr. 4, 1994

Related U.S. Application Data

[63] Continuation-in-part of Ser. No. 851,576, Mar. 16, 1992, Pat. No. 5,303,478.

[51] Int. Cl.⁶ .................................................. B23D 49/12
[52] U.S. Cl. ............................................. 30/392; 30/507; 30/513
[58] Field of Search ................. 30/392, 509, 513, 369, 30/507, 514, 517, 166.3

[56] References Cited

U.S. PATENT DOCUMENTS

| | | | |
|---|---|---|---|
| 2,253,440 | 8/1941 | Martin | 30/513 |
| 3,807,471 | 4/1974 | Dreier | 30/513 |
| 3,840,059 | 10/1974 | Ingro | 30/514 |
| 5,027,518 | 7/1991 | Adomatis | 30/392 |
| 5,303,478 | 4/1994 | Gugel | 30/392 |
| 5,313,709 | 5/1994 | Pabon-Delgado | 30/513 |

Primary Examiner—Hwei Siu Payer

[57] ABSTRACT

A hack-saw that consists of a powered motor encased in a housing unit with a handle for gripping by the operator. Extending out from the top of the handle is an elongated bar which runs out forward from the motor housing unit to which depends a leg parallelly disposed relative to the motor housing. Extending out from the bottom of this leg is a rod, spring and nut assembly parallel in line to the elongated bar. One end of the metal hack-saw blade is removably attached to the rod, spring and bolt assembly and the other end of the blade is removably attached to the reciprocating output member of the motor extending out from the bottom of the motor housing which when running moves back and forth, causing a sawing motion. In another embodiment the rod, spring and nut assembly includes an anti-rotational structure to assure the hack-saw blade reciprocates over a constant path of travel to avoid misalignment.

2 Claims, 3 Drawing Sheets

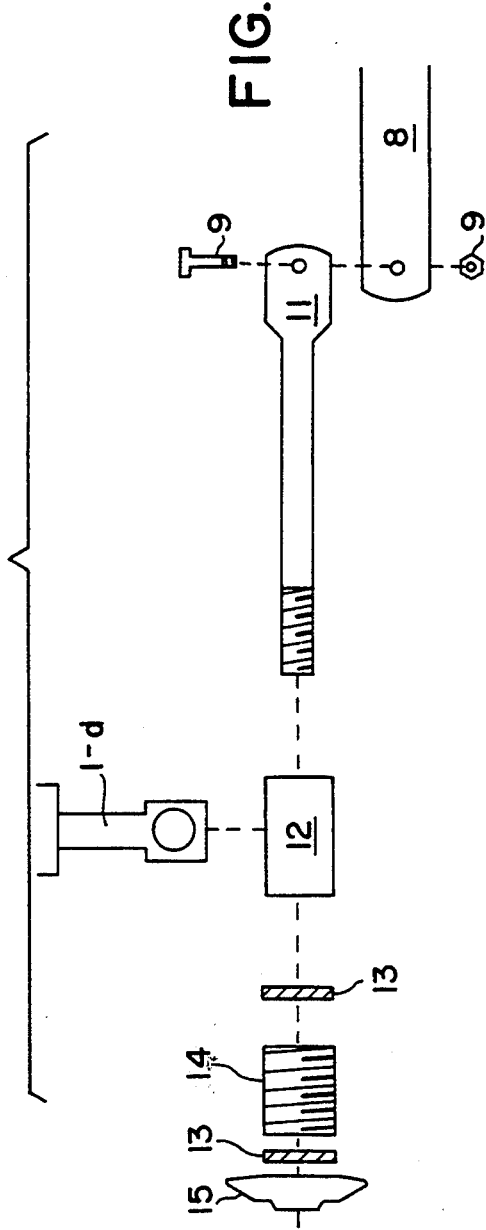
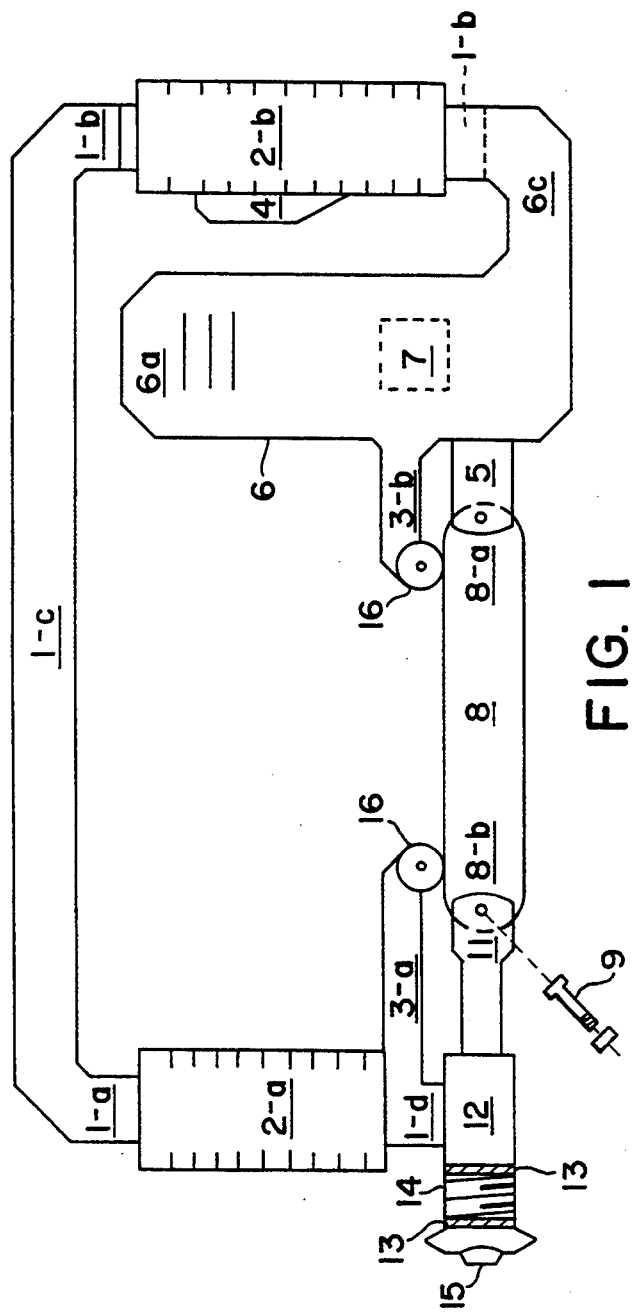
FIG. 2
FIG. 1

PORTABLE POWERED HACK-SAW

CROSS REFERENCE

This is a continuation-in-part of U.S. patent application Ser. No. 07/851,576 filed Mar. 16, 1992 to be issued as U.S. Pat. No. 5,303,478 on Apr. 19, 1994.

TECHNICAL FIELD

This invention relates to hack-saws and more particularly to a hand-held portable powered hack-saw utilized for cutting.

BACKGROUND ART

As one familiar with cutting or sawing tools, the hack-saw is typically designed to be hand held and operated and compact in size for portable use. The only known device in use at present time that utilizes some sort of power which would come close in description to the present invention would be the portable band saw. This device, however, is bulkier in size, and consequently, heavier in weight, and implements a different method for cutting, i.e. a metal band attached to two common axes. While this device may be practical for cutting through larger sheets of metal, due to its size and weight, it is not practical for smaller operations such as cutting through metal or plastic pipe or for cutting bolts or screws. Additionally it is relatively expensive to purchase.

I have found that I can provide a lighter, more compact, and less costly cutting tool with the same basic purpose in mind. It is also adaptable to be cord operated powered by either available A.C. or D.C. electrical power of the type typically delivered to residential and commercial buildings and the like or operated by battery, hydraulic, or pneumatic powered motors.

SUMMARY OF THE INVENTION

An object of this invention is to provide a hand-held portable powered hack-saw where the source of power for powering the motor can be from a customary electrical AC or DC outlet, a battery, or a pneumatic or hydraulic system.

This device is a cutting device, or commonly referred to as a hack-saw consisting of a motor housing unit encased in a mainframe or casing fixedly mounted to or integrally formed frame supporting the outer end of a metal hack-saw blade having an inner end removably mounted to a reciprocally driven linkage connected to a motor contained in the casing. The metal hack-saw blade is to be used for cutting through objects intended to be cut, as for example metal, plastic pipes, wall board, wood and the like. The advantage to this invention is that it allows for a much quicker and less tiring method for cutting through such objects, since it is the only power device of its kind providing a quicker forward and backward motion for cutting. Also due to its lighter size and fewer parts in assembly, it provides a more cost-effective means than other substitute devices available in the market today.

A feature of this invention is the spring loaded anti-rotational rod that attaches to the end of the removable hack-saw blade for preloading the blade and assist and resist the force generated by the motor.

BRIEF DESCRIPTION OF DRAWINGS

FIG. 1 is a view in elevation depicting the invention;

FIG. 2 is a partial exploded view showing the details of the spring housing assembly of FIG. 1;

BEST MODE FOR CARRYING OUT THE INVENTION

Figure 3:
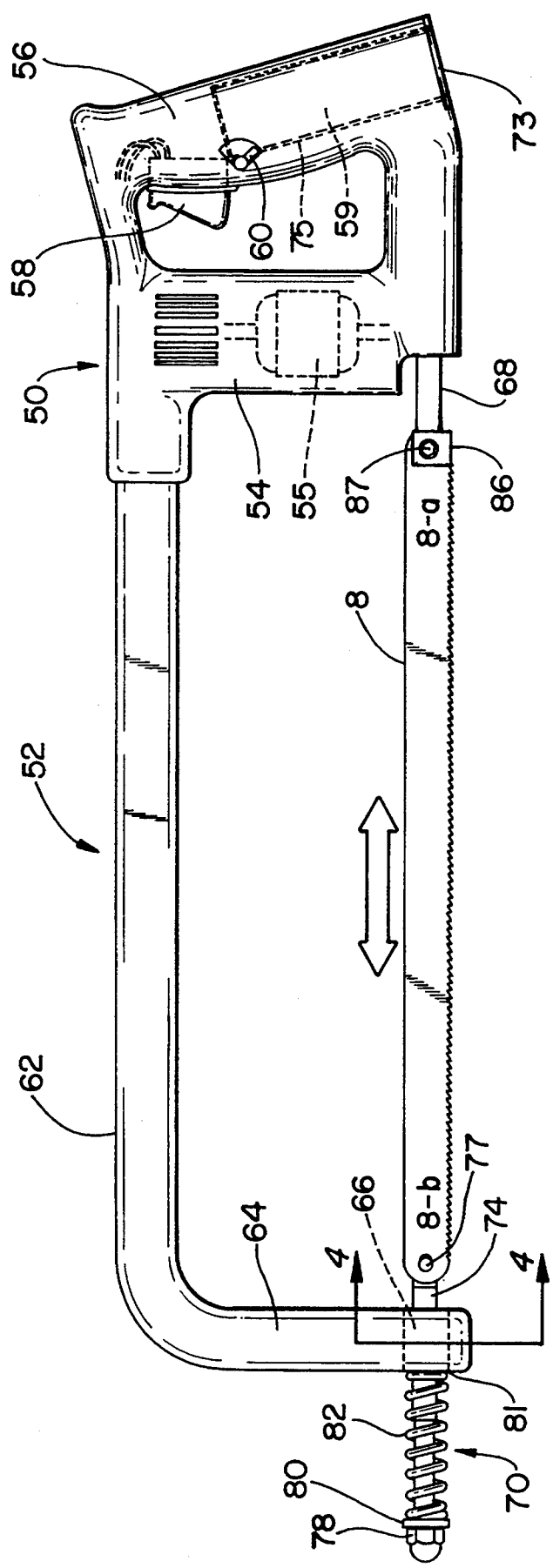
FIG. 3 is a view in elevation exemplifying another embodiment of this invention.

Referring to FIGS. 1 and 2 the c-shaped frame of the electric powered cutting saw is generally depicted by reference numeral 1. This frame being of ¼ inch thickness by 1 inch diameter iron stock and can vary in diameter and thickness from 4 inches to 12 inches in height and 1 foot to 2 feet in length. Rubber grips 2-a and 2-b are of ½ to 1 inch diameter and are located on opposite sides leg portion 1a and 1b of the c-shaped frame 1. Rubber grip 2-a is located on second leg 1-a of the c-shaped frame 1 with its base directly above roller arm 3-a. Rubber grip 2-b is mounted on second leg portion 16 of u-shaped mainframe casing 6 and first leg portion 1-b of c-shaped frame 1. (since u-shaped casing 6, and c-shaped frame 1 are interconnected, they are both consequently mounted to the rubber grip 2-b).

On-off switch 4 is mounted to the second leg portion 16 of the u-shaped casing 6 and is operable to connect the a.c. power to the electric motor 7 resulting in powering the reciprocating output shaft 5. Rubber grip 2-b has an opening to allow for on-off switch 4 to protrude and be accessible to the operator.

First leg 1-b of c-shaped frame 1 will be fixedly mounted within second leg 6-b of u-shaped casing 6 so that lateral portion 1-c of c-shaped frame 1 runs parallel with the hack-saw blade 8 and the second leg 1-a of the c-shaped frame 1 runs parallel with the first leg 6-a of the u-shaped casing mainframe 6. The u-shaped casing mainframe 6 consists of a first leg portion 6-a, a second leg portion 6-b, and a lateral portion 6-c. The lateral portion 6-c of the u-shaped mainframe casing 6 runs parallel with the lateral portion 1-c of the c-shaped frame 1. The first leg 6-a of the u-shaped casing 6 houses the motor means 7.

Motor means 7 is connected to a reciprocating output 5 which extends from the base of the u-shaped casing mainframe 6 and to which is attached the proximal end 8-a of the hack-saw blade 8 by means of a lock-nut and bolt 9. The hack-saw blade 8 will be approximately 10 inches to 17 inches long, including a proximal end 8-a and distal end 8-b end, and being of a rigid main body incapable of supporting itself during sawing without its distal end 8-b being supported.

The spring means as shown consists of a first mount 11 which is inserted through the spring housing assembly 12. The threaded end of the first mount 11 is to be secured with a washer 13, a spring 14, a second washer 13, and a locking wing nut 15. The diameter of the first mount 11 is to be approximately 5/16 inch. At the base of the second end portion 1-d of the second leg 1-a of the c-shaped frame 1, there will be a hole. The hole opening is to run parallel with the lateral portion 1-c of the c-shaped frame 1 and is to allow for insertion of the housing assembly 12 so that housing assembly 12 is reciprocally and removably mounted to the base of the second end portion 1-d of the c-shaped frame 1. At the end of the first mount 11 opposite the threaded end, there will be a hole for which to mount the distal end 8-b of the hack-saw blade 8 by means of a lock-nut and bolt 9. The length of the first mount 11 and the length of the spring 14 will be determined by the length and specifications of the saw blade 8. Wing nut 15 will be tightened snugly so as to leave spring 14 with ample release motion.

There are, as indicated in FIGS. 1 and 2, two outwardly extending roller arms 3-a and 3-b which are present to maintain stability of the hack-saw blade 8 while it is moving. Roller arm 3-a is an outwardly extending arm fixedly mounted at the base of the second end portion 1-d of the c-shaped frame 1 directly above the spring housing assembly 12 and extending out parallel in line with the lateral portion 1-c of the c-shaped frame 1 and the hack-saw blade 8. To the end of the roller arm 3-a is attached a roller 16 which comes in contact with the hack-saw blade 8 while it is connected at the distal end 8-b. The roller arm 3-b is an outwardly extending arm fixedly mounted at the base of the first leg 6-a of the u-shaped mainframe casing 6 directly above the reciprocating output 5 and extending out parallel in line with the lateral portion 1-c of the c-shaped frame 1 and the hack-saw blade 8. To the end of the roller arm 3-b is attached a roller 16 which comes in contact with the hack-saw blade 8 while it is connected at the proximal end 8-a. The rollers 16 are rotatably mounted to the roller arms 3-a and 3-b.

Spring housing assembly 12, shown in FIG. 2, consists of the first mount 11, the lock-nut and bolt 9, the washers 13, the spring 14, and the locking wing nut 15. The illustration shows how the spring housing assembly 12 mounts to the base of the second end portion 1-d of the c-shaped frame 1, and how the first mount 11 is connected to the distal end 8-b of the hack-saw blade 8 and also secured to the spring housing assembly 12 by the means of the spring 14, washers 13, and locking wing nut 15.

For the sake of understanding how the spring housing assembly 12 is inserted through the base of the second end portion 1-d of the c-shaped frame 1, a front view of the lower half of the second leg 1-a of the c-shaped frame 1 is shown in FIG. 2.

The electric motor 7 housed within the grounded u-shaped mainframe or casing 6 may be, 120 volts a.c. and, rotates at 3200 rpm's. Also the motor 7 shall be double insulated at 2.2 amps.

Figure 4:
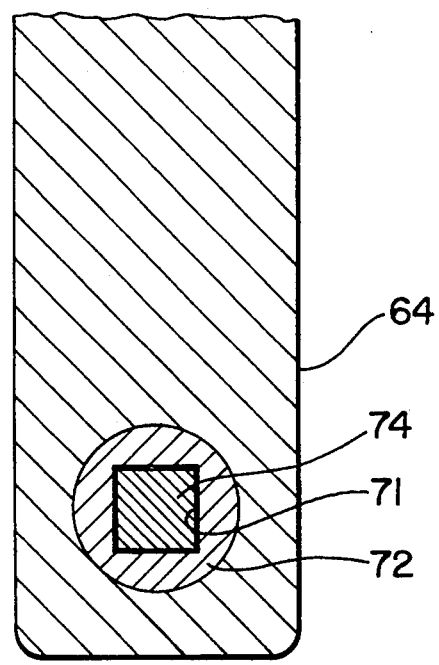
FIG. 4 is a sectional view taken through lines 4—4 of FIG. 3.

Another embodiment of this invention is exemplified in FIGS. 3 and 4 as comprising main housing generally indicated by reference numeral 50 and blade support frame generally indicated by reference numeral 52. The main housing 50 includes a main body or case 54 adapted to house the motor 55. A suitable handle 56 axially extends from end of the case 54 to allow the operator to hold the hack-saw in one hand. Battery 59 fits into compartment 75 formed in handle 56 and is a cartridge that is inserted through a door 73 formed on the bottom of handle 56. A suitable and commercially available switch 58 is conveniently supported to and projects from the handle to be engaged by the operator for engaging the switch connectors for connecting the motor to the power source (battery 59) so as to turn the powered hack-saw on and off. While this embodiment employs a battery as the power source, it is contemplated that other power sources such as the electricity (AC or DC) obtained from an ordinary electrical outlet being serviced by a private or public utility or generator, or from a suitable commercially available pneumatic or hydraulic system. A safety lever 60 mounted on the handle and suitably connected to the switch 58 serves to prevent the switch from being turned on inadvertently.

The blade support frame 52 may be attached to the upper portion of the case 54, as shown, or may be integrally formed with case 54 and defines therewith a U-shaped portion with main housing 50. The case 54 is preferable made from a suitable, commercially available plastic material and the blade support frame may be made from either a suitable metal or plastic material. The elongated axially extending portion 62 extends parallel to the hack-saw blade 8 (like parts depicted in all the Figs. bear the same reference numerals) and the depending leg 64 extends parallel to the case 54 and includes an aperture 66 whose center line aligns with and is in coincidence with longitudinal axis of the reciprocating rod 68 suitably driven by the motor 55. The spring and support assembly generally indicated by reference numeral 70 fits into aperture 66 formed in the bottom end of depending leg 64 for supporting the distal end 8-b of hack-saw blade 8. Spring and support assembly 70 consists of bushing 72 (FIG. 4) having a square or rectangular slot 71 extending axially therethrough for supporting the rod 74 for reciprocating movement. The cross section of fore portion of rod 74 is rectangularly or square shaped and complements the shape of slot 71 which serves as an anti-rotation mechanism to assure that the hack-saw blade runs through when in operation. The fore end of rod 74 is milled or sliced to accommodate the attachment for the distal end 8-b of hack-saw 8. Suitable attaching means such as screw 77 serves to attach the hack-saw blade thereto. The aft end of rod 74 is cylindrically shaped and threaded to receive a nut 78. Washer or spring retainer 80 is suitably attached to the threaded end of rod 74. Coil spring 82 is disposed between the spring retainer 80 and the back face 81 of depending leg 64.

As is apparent from the foregoing, when the hack-saw blade 8 is driven toward the motor spring 82 is compressed and when the hack-saw blade 8 moves in the opposite direction spring 82 releases its energy and expands, always placing some load on the hack-saw blade 8. Tightening or loosening nut 78 serves to contract or expand the spring 82 so as to put the proper pre-load on the hack-saw blade. Also, by pushing on the nut 78 toward the case 54 compresses the spring 82 which, in turn, releases the load on the hack-saw blade and allows the easy removal or insertion thereof.

The cross section of the reciprocating rod 68, which is the output of motor 55, is contoured similar to the cross-section of the fore end of the rod 74. This has a dual purpose of accepting U-shaped collar 86 and the affixed securing screw 87 to attach the proximal end 8-a of the hack-saw blade 8 to the end of rod 68 and to serve as an anti-rotation mechanism similar to the anti-rotational feature associated with the fore end of rod 74.

What is disclosed by this invention is a hand-held portable hack saw that is adapted to be electrically (cord or battery), pneumatically or hydraulically powered, with an axial loading mechanism to load the reciprocating hack-saw blade in both the fore and aft directions.

I claim:

1. A portable powered hack-saw comprising:
   a case,
   motor means housed in and supported by said case and having a reciprocating output extending through said case, a hack-saw blade removably mounted to said reciprocating output of said motor for reciprocal motion, said hack-saw blade including a proximal end and a distal end, said hack-saw blade including a main body incapable of supporting itself during sawing without said distal end being supported, support frame means extending outwardly from said case, said support frame means having a depending leg with an end portion thereon and a lateral portion extending between said depending leg and said case with said lateral portion spaced apart from and parallely disposed relative to said hack-saw blade, spring and support assembly means attached to said end portion of said depending leg for supporting said distal end of said hack-saw blade and to axially load said hack-saw blade so as to force and resist movement of said hack-saw blade in a direction opposite to forced movement of said hack-saw blade by said motor means, said spring and support assembly means including mount means reciprocally supported in an aperture formed in said end portion of said depending leg, said distal end of said hack-saw blade being removably connected to said mount means, said spring and support assembly means further including spring means operably connected to said mount means to push said mount means and said hack-saw blade in a direction toward said motor means but yieldable to allow said motor means to push said mount means and said hack-saw blade away from said motor means, said mount means includes a rod having a longitudinal axis and said output means includes a shaft having a longitudinal axis disposed in coincidence with the longitudinal axis of said rod, and wherein the contour of said rod reciprocating in said aperture complements the shape of said aperture so that the hack-saw blade reciprocates along a constant path of travel, and a handle extending from said case adapted to be gripped by an operator to permit said portable powered hack-saw to be held in one hand of the operator, 2. A portable powered hack-saw comprising a case, a motor housed in and supported by said case and having a reciprocating shaft driven by said motor extending through said case, a handle extending from and formed in said case adapted to be gripped by an operator so a to hold said portable hack-saw in one hand, a hack-saw blade removably attached to said reciprocating shaft of said motor for reciprocal motion, said hack-saw blade including a proximal end and a distal end, said hack-saw blade including a main body incapable of supporting itself during sawing without said distal end being supported, support frame means extending outwardly from said case and defining with said case a U-shaped member, said U-shaped member having a depending leg with an end portion thereon and a lateral portion extending between said depending leg and said case with said lateral portion spaced apart from and parallelly disposed relative to said hack-saw blade, support assembly means attached to said end portion of said depending leg for supporting said distal end of said hack-saw blade, said support assembly means including a rod reciprocally supported in an aperture formed in said end portion of said depending leg, said distal end of said hack-saw blade being removably connected to said rod, wherein the contour of said rod reciprocating in said aperture complements the shape of said aperture so that the hack-saw blade reciprocates along a constant path of travel and is prevented from misalignment, said support assembly means further including resilient and flexible means operably connected to said rod to apply a force to said rod and said hack-saw blade in a direction toward said motor but yieldable to allow said motor to push said rod and said hack-saw blade way from said motor, a source of power, and switch means mounted in said handle extending therethrough to interconnnect said motor and said power for actuating said hack-saw to on and off positions.

* * * * *